United States Patent
Luecke et al.

(10) Patent No.: US 10,853,522 B2
(45) Date of Patent: Dec. 1, 2020

(54) AUTOMATIC CLOSING OF NON-SECURE PORTS IN A REMOTE NETWORK COMMUNICATIONS DEVICE

(71) Applicant: ITRON NETWORKED SOLUTIONS, INC., San Jose, CA (US)

(72) Inventors: Thomas Luecke, San Jose, CA (US); Nelson Bolyard, San Jose, CA (US); Winston Lew, San Jose, CA (US)

(73) Assignee: ITRON NETWORKED SOLUTIONS, INC., San Jose, CA (US)

( * ) Notice: Subject to any disclaimer, the term of this patent is extended or adjusted under 35 U.S.C. 154(b) by 254 days.

(21) Appl. No.: 16/001,084

(22) Filed: Jun. 6, 2018

(65) Prior Publication Data

US 2018/0349648 A1 Dec. 6, 2018

Related U.S. Application Data

(60) Provisional application No. 62/515,611, filed on Jun. 6, 2017.

(51) Int. Cl.
| | |
|---|---|
| *H04L 29/06* | (2006.01) |
| *G06F 21/74* | (2013.01) |
| *G01D 4/00* | (2006.01) |
| *G06F 21/82* | (2013.01) |
| *H04W 12/08* | (2009.01) |
| *H04W 48/06* | (2009.01) |
| *H04W 76/15* | (2018.01) |

(52) U.S. Cl.
CPC ............. *G06F 21/74* (2013.01); *G01D 4/004* (2013.01); *G01D 4/006* (2013.01); *G06F 21/82* (2013.01); *H04L 63/0236* (2013.01); *H04L 63/1433* (2013.01); *H04W 12/0808* (2019.01); *G01D 4/002* (2013.01); *H04W 48/06* (2013.01); *H04W 76/15* (2018.02)

(58) Field of Classification Search
CPC .......... G06F 21/74; G06F 21/70; G06F 21/82; H04L 63/0236; H04L 63/1433; H04L 41/0803; H04L 67/125; G01D 4/004; G01D 4/006; G01D 4/002; H04W 12/0808; H04W 76/15; H04W 48/06

See application file for complete search history.

(56) References Cited

U.S. PATENT DOCUMENTS

| | | | |
|---|---|---|---|
| 6,397,301 B1 * | 5/2002 | Quach | G06F 12/0802 711/138 |
| 9,021,585 B1 * | 4/2015 | Paczkowski | G06F 21/53 455/550.1 |
| 2016/0018465 A1 * | 1/2016 | Bockelkamp | G06F 11/3656 714/726 |

* cited by examiner

*Primary Examiner* — Yogesh Paliwal

(57) ABSTRACT

A communications device has a first communications port via which secure messages are received, and a second communications port via which non-secure messages are received. In response to detecting that a secure message has been received, the device determines whether the second communications port is in a state that enables non-secure messages to be received. If the second communications port is in the enabled state, the device autonomously disables the second communications port to preclude non-secure messages received at that port from being processed.

18 Claims, 2 Drawing Sheets

AUTOMATIC CLOSING OF NON-SECURE PORTS IN A REMOTE NETWORK COMMUNICATIONS DEVICE

BACKGROUND

This disclosure relates to communication devices with non-secure communication ports that enable them to be locally configured, e.g., at the time of installation, for communication over a network, such as a wireless mesh network. One example of such a device is a smart meter. Typically, at the time of installation, the smart meter may be pre-loaded with security credentials and firmware necessary for communications over at least one network. However, before it is able to communicate via the network, it may need to be provided with additional information that becomes available at the time of installation and set-up. For instance, it may need to be loaded with information that pertains to its physical location. In addition, it may need to be provided with one or more network addresses that are assigned by access points in the vicinity of the meter.

To enable the meter to receive this additional information, the meter has a non-secure port that enables a technician to conduct communications with the meter. For example, the meter may include an optical port via which the technician can send commands and data via light pulses. Alternatively, other media can be used to communicate with the meter, for example a plug-in socket for direct wired communications, or other forms of proximity wireless communications, e.g. NFC, Bluetooth, etc. Alternatively, or in addition, the non-secure port may be capable of receiving communications from a remote site, e.g., via a wireless network.

SUMMARY

A communications device has a first communications port via which secure messages are received, and a second communications port via which non-secure messages are received. In response to detecting that a secure message has been received, the device determines whether the second communications port is in a state that enables non-secure messages to be received. If the second communications port is in the enabled state, the device autonomously disables the second communications port to preclude non-secure messages received at that port from being processed.

DETAILED DESCRIPTION

Figure 1:
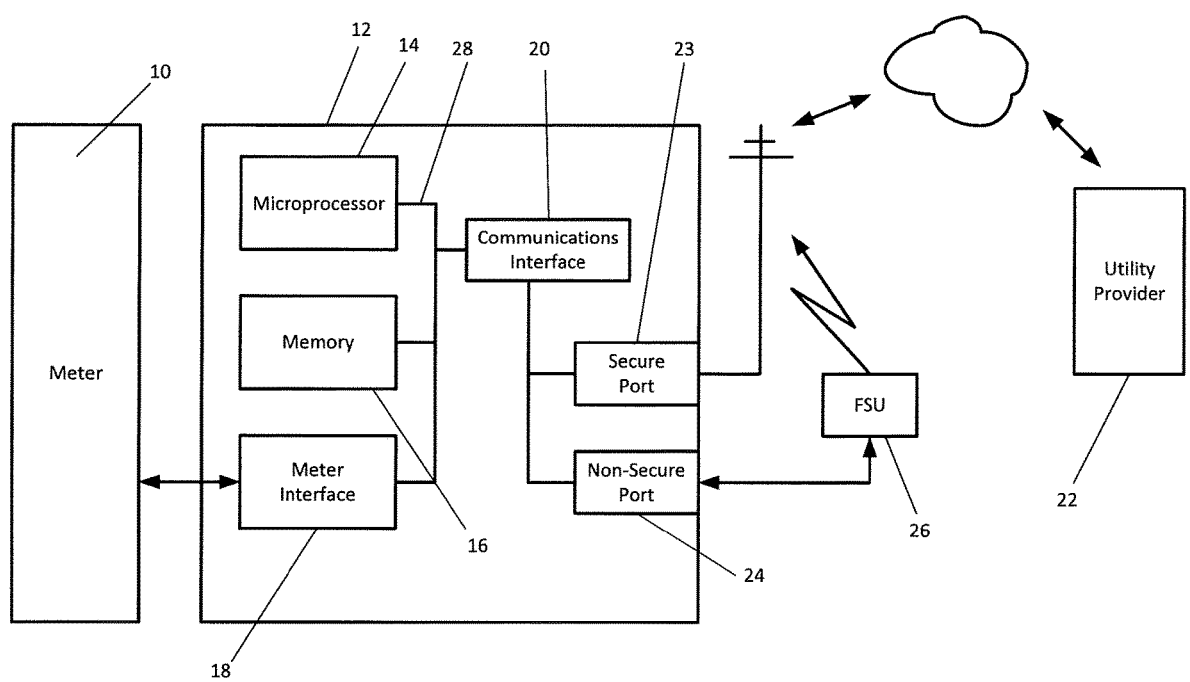
FIG. 1 is a block diagram of an exemplary device that communicates via a wireless network.

An illustrative diagram of components of an exemplary communications device, in this case a smart meter, is illustrated in FIG. 1. The meter 10 includes suitable known circuits and other hardware elements for measuring the consumption of a commodity provided by a utility, such as electricity, gas and/or water. Associated with the meter is a network interface card 12. Although illustrated in the figure as being separate from the meter itself, the network interface card is typically incorporated within the housing of the meter. The network interface card includes a microprocessor 14 for processing commands, accessing a memory 16, and communicating with the meter 10 via a meter interface 18, to obtain consumption data and other relevant information. The network interface card 12 includes a communications interface 20 for communicating with a utility provider 22 via a local area network and/or a wide area network. For this purpose, the communications interface includes, or is otherwise connected to, a secure communications port 23. The communications interface 20 further includes a non-secure port 24 that can communicate with a field service unit 26, which is carried by service personnel and may communicate via optical or other suitable medium. The field service unit 26 may also be capable of communicating with the network interface card 12 via the secure port 23 of the communications interface 20, using RF signals. The microprocessor 14 communicates with each of these other components of the network interface card 12 via a data bus 28.

Communications between the network interface card 12 and the utility provider 22, via the communications interface 20, are carried out through the secure port 23 in a protected manner, using one or more authenticity certificates and private/public key pairs that are pre-stored in the memory 16 of the network interface card 12. Unlike the secure port 23, however, communications conducted via the non-secure port 24 are not protected, so that the meter can be initially configured with the information necessary to enable it to conduct communications over a secure network. The non-secure port might also be subsequently used for testing and/or diagnosis in the event of a problem or failure. Because it is not secure, there is a concern that this port 24 renders the meter susceptible to hacking. For instance, it might be used to send rogue commands, e.g., change network ID, to the processor. Moreover, a customer might be able to modify data or software code so that the meter reports less than the actual amount of the commodity being consumed.

To reduce the vulnerability to hacking, the utility provider 22 may institute a periodic campaign to disable, or close, the non-secure port on installed meters after the meters have been configured and are able to securely communicate with the utility provider over the wireless network. For instance, the utility provider may keep a log of newly-installed meters with which it has successfully conducted a secure communication. At certain periodic intervals, it can send a command via the wireless network, instructing those new meters to close their non-secure ports from any further communications. Alternatively, the utility provider may periodically conduct a sweep of all installed meters, transmitting a command to close their non-secure ports. In these situations, the time between the initial configuration of the meters to enable secure communications, and the transmission of the command to close the non-secure ports, may be considerable, e.g., several days, and more likely weeks. During this time, the meters remain vulnerable to hacking.

In addition, a meter may be programmed with a watchdog functionality, in which it monitors the receipt of secure transmissions from the utility provider 22. If no transmissions have been received within a certain period of time, e.g. a few days, the meter may re-open, or enable, the non-secure port 24, to permit a technician to locally diagnose the meter, e.g. using a field service unit 26. Once the meter opens the non-secure port, it remains susceptible to hacking until a new command to close the port is sent by the utility provider 22.

Figure 2:
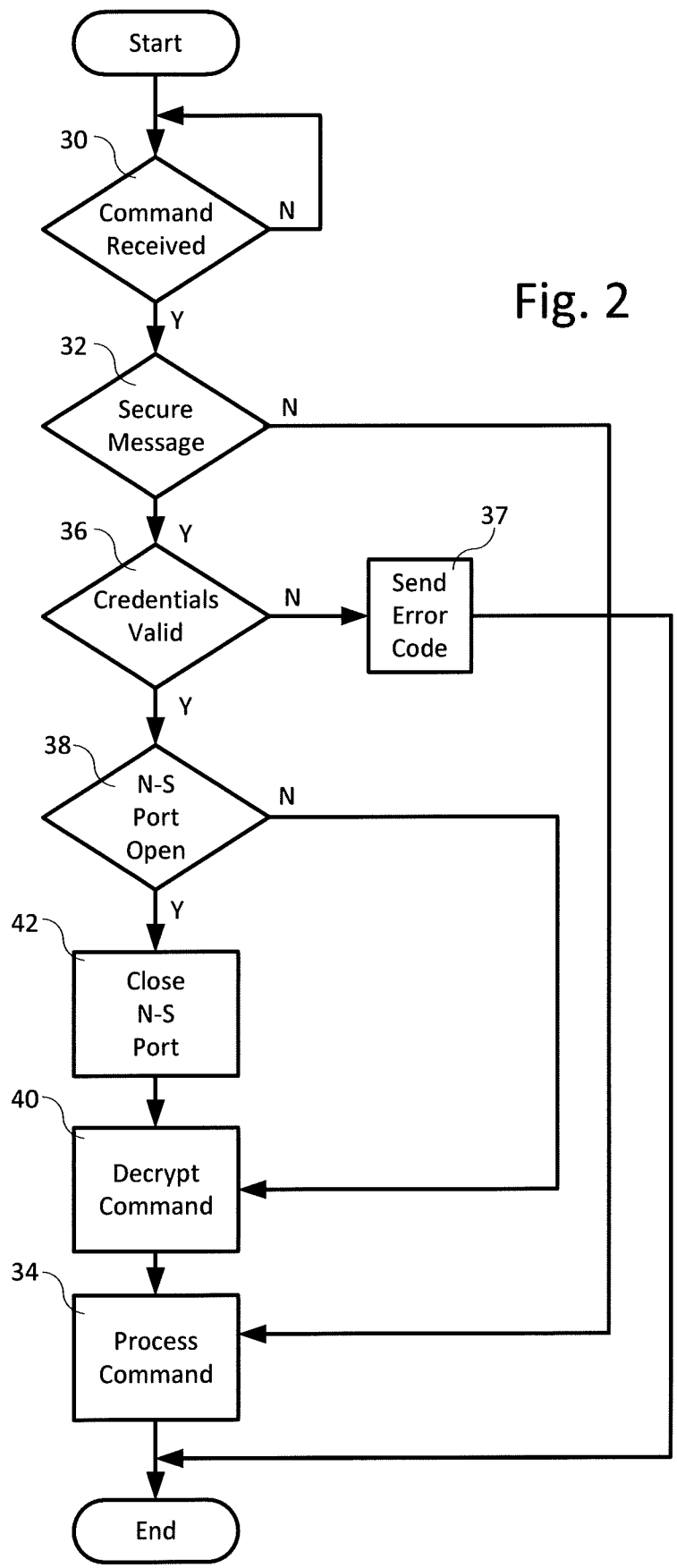
FIG. 2 is a flowchart illustrating an embodiment of an operation for autonomously closing a non-secure port of the communication device.

To address these concerns, the meter itself can be provided with functionality to autonomously close the non-secure port once it has been successfully configured for secure communications via the wireless network. FIG. 2 is a flowchart of one example of an algorithm that can be included in the firmware of the network interface card 12, to provide such functionality.

The first step in establishing a secure communication is a process that creates a secure association where credentials are exchanged between participants, e.g., the smart meter and the utility provider, and validated. If the credentials are valid, then a secure association is created and an association identifier is assigned. Subsequent secure messages are encrypted using the key generated from the information exchanged during the secure association process, and identified to the meter using the association identifier.

Referring to FIG. 2, at step 30 the microprocessor 14 continuously monitors the data bus 28 for receipt of messages containing commands, which could be received via the secure port 23 or the non-secure port 24, or any other communications port (not shown) via which external communications can be received. When a message is received, at step 32 the processor determines whether it is a secure message, e.g., the message contains the association identifier corresponding to the security credentials that are stored in the memory 16 of the network interface card 12. If the message is not a secure one, e.g., it was received via the non-secure port 24, the microprocessor 14 processes the received command at step 34.

If the microprocessor 14 determines at step 32 that it has received a secure message, it determines at step 36 whether all of its credentials stored in the memory 16 are valid. For example, it may verify that all authenticity certificates are up to date, and the security keys have not expired. If stored credentials are determined not to be valid, or if there are no credentials stored in the memory, the command cannot be decrypted, and it is discarded. At step 37, an error code is sent as a response to the command, and the process ends.

If the stored credentials are determined to be valid, the microprocessor checks at step 38 whether the non-secure port 24 is open. For example, the state of the non-secure port, open or closed, might be indicated by a value stored in the memory 16. If the microprocessor 14 determines that the non-secure port is not open at step 36, it decrypts the received command at step 40, and processes it at step 34.

If the microprocessor 14 determines that the non-secure port is open at step 38, it proceeds to step 42, to close the non-secure port. In other words, once a valid secure command is received from the utility provider 22, all further communications with the meter should be conducted in a secure manner, and there is no longer a reason to maintain the non-secure port 24 in an open state, except in situations that require testing and/or diagnosis. Closing of the port may comprise activating a command that causes all further communication packets from that port to be blocked, or dropped. As a result, sensitive commands received via the non-secure port, which could be used for hacking purposes, will not be accepted by the microprocessor. After closing the port, the microprocessor 14 proceeds to decrypt the received secure command at step 40, and processes the command at step 34.

From the foregoing, it can be seen that the non-secure port is cut off from receiving external commands as soon as a secure communication is successfully received via the wireless network. This operation is performed on a per-device basis in response to receipt of a secure message, and significantly reduces the period of time during which the device is vulnerable to hacking. In fact, the closing of the non-secure port may occur while the technician is still present at the location of the meter and finishing the installation process. A secure message can be sent from the field service unit 26 to the secure port 23 of the communications interface 20 to trigger such a result. Moreover, if the meter has a watchdog function, and should open the non-secure port 24 for diagnostic purposes, it will be re-closed as soon as the diagnosis is complete and a secure communication has been received.

The foregoing description of the functionality for automatically closing the non-secure port is presented in the context of a port that is used for the initial configuration, and subsequent testing and diagnosis, of a meter. However, it will be appreciated that the application of this functionality is not limited to that particular type of port. Rather, it can be employed for any port that enables open, non-secure communications to be carried out with the meter.

Moreover, while the example of a meter for measuring consumption of a commodity has been provided for the purpose of demonstrating the automatic closing functionality, it will be appreciated that such functionality is not limited to this particular type of network device. Rather, it is applicable to any type of communications device that is intended to operate via secure communications, but also has a feature that enables non-secure communications to be conducted via one or more communication ports.

The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A communications device, comprising:
    a communications interface having a first communications port via which secure messages are received, and a second communications port via which non-secure messages can be received; and
    a microprocessor configured to perform the following operations:
        detect whether a secure message has been received;
        in response to detecting that a secure message has been received, determine whether the second communications port is in a state that enables non-secure messages to be received; and
        in response to determining that the second communications port is in the enabled state, disable the second communications port to preclude messages received at the second communications port from being processed.

2. The communications device of claim 1 wherein, in response to detecting that a secure message has been received, and prior to determining whether the second communications port is in the enabled state, the microprocessor is configured to determine whether valid security credentials for processing the secure message are stored in the communications device.

3. The communications device of claim 2 wherein, in response to determining that valid security credentials are not stored in the communications device, the microprocessor is configured to discard the received message and send an error message as a response to the received message.

4. The communications device of claim 1, wherein the second communications port is at least one of:
    an optical port;
    a socket for wired communications; and
    a proximity wireless communications port.

5. The communications device of claim 1, wherein the second communications port is configured to receive communications transmitted via a wireless network.

6. The communications device of claim 1, wherein the first communications port is configured to receive communications transmitted via a wireless network.

7. The communications device of claim 1, wherein the operation of disabling the second communications port comprises activating a command that causes packets received at the second communications port to be blocked.

8. The communications device of claim 1, wherein the operation of disabling the second communications port comprises activating a command that causes packets received at the second communications port to be dropped.

9. A method for processing messages in a communications device having a non-secure communications port, comprising:
   detecting whether a secure message has been received;
   in response to detecting that a secure message has been received, determining whether the non-secure communications port is in a state that enables messages to be received, and
   in response to determining that the non-secure communications port is in the enabled state, disabling the non-secure communications port to preclude messages received at the non-secure communications port from being processed.

10. The method of claim 9 further including, in response to detecting that a secure message has been received, and prior to determining whether the non-secure communications port is in the enabled state, determining whether valid security credentials for processing the secure message are stored in the communications device.

11. The method of claim 10 further including, in response to determining that valid security credentials are not stored in the communications device, discarding the received message and sending an error message as a response to the received message.

12. The method of claim 9, wherein disabling the non-secure communications port comprises activating a command that causes packets received at the non-secure communications port to be blocked.

13. The method of claim 9, wherein disabling the non-secure communications port comprises activating a command that causes packets received at the non-secure communications port to be dropped.

14. A non-transitory computer-readable medium encoded with program instructions that, when executed, cause a processor in a communications device to perform the following operations:
   detect whether a secure message has been received;
   in response to detecting that a secure message has been received, determine whether a non-secure communications port of the communications device is in a state that enables messages to be received; and
   in response to determining that the non-secure communications port is in the enabled state, disable the non-secure communications port to preclude messages received at the non-secure communications port from being processed.

15. The non-transitory computer-readable medium of claim 14 further including program instructions that cause the processor, in response to detecting that a secure message has been received, and prior to determining whether the non-secure communications port is in the enabled state, to determine whether valid security credentials for processing the secure message are stored in the communications device.

16. The non-transitory computer-readable medium of claim 15 further including program instructions that cause the processor, in response to determining that valid security credentials are not stored in the communications device, to discard the received message and send an error message as a response to the received message.

17. The non-transitory computer-readable medium of claim 14, wherein disabling the non-secure communications port comprises activating a command that causes packets received at the non-secure communications port to be blocked.

18. The non-transitory computer-readable medium of claim 14, wherein disabling the non-secure communications port comprises activating a command that causes packets received at the non-secure communications port to be dropped.

* * * * *